United States Patent [19]

Uffenheimer

[11] Patent Number: 4,758,409

[45] Date of Patent: Jul. 19, 1988

[54] MICROSAMPLE CUP

[75] Inventor: Kenneth F. Uffenheimer, Chappagua, N.Y.

[73] Assignee: Techicon Instruments Corporation, Tarrytown, N.Y.

[21] Appl. No.: 884,019

[22] Filed: Jul. 10, 1986

[51] Int. Cl.[4] .......................... B01L 3/00; G01N 1/12

[52] U.S. Cl. .................................... 422/102; 128/763; 128/767; 73/864.51; 73/864.53; 206/438

[58] Field of Search .................. 422/63, 102; 206/438; 220/354; 73/864.21, 864.51, 864.53, 864.59; 356/246; 210/120; 128/763, 767

[56] References Cited

U.S. PATENT DOCUMENTS

| | | | |
|---|---|---|---|
| 2,154,741 | 4/1939 | Gray | 220/354 |
| 4,325,390 | 4/1982 | Kaaler | 220/354 |
| 4,602,995 | 7/1986 | Cassaday et al. | 210/120 |

*Primary Examiner*—Benoit Castel

*Attorney, Agent, or Firm*—Jeffrey M. Greenman; James J. Romano, Jr.

[57] ABSTRACT

New and improved microsample cup is provided, and comprises an outer cup body member, and an inner sample liquid vessel disposed and supported therewithin. An integral sample liquid overflow reservoir is provided to surround the inner sample liquid vessel to facilitate the precise filling of the same to a predetermined level coincident with the maximum sample liquid capacity thereof by enabling the overflow from the sample liquid vessel of any sample liquid in excess of the maximum sample liquid vessel capacity into the sample liquid overflow reservoir. Extension of the outer cup body member significantly above the inner sample liquid vessel inhibits evaporation of the sample liquid therefrom, inhibits spillage of the sample liquid from the microsample cup as a whole, and inhibits accidental contact with the sample liquid by the fingers of the operator; while extension of the outer body member significantly below the inner sample liquid vessel cooperates with the above to facilitate manual handling of the microsample cup.

8 Claims, 2 Drawing Sheets

MICROSAMPLE CUP

BACKGROUND OF THE INVENTION

1. Field of the Invention

This invention relates to a new and improved microsample cup which is particularly adapted for use in contemporary automated sample liquid analysis systems.

2. Description of the Prior Art

Although a variety of microsample cups, e.g. sample cups which are specifically designed for the containment of very small sample liquid quantities ranging for example from 200 to 500 microliters, are known in the prior art, none are known which are configured or operable in the manner of the new and improved microsample cup of this invention, or which provide the significant advantages as are provided by the latter.

More specifically, the 500 microliter microsample cup currently marketed by applicant's assignee, the Technicon Instruments Corporation of Tarrytown, N.Y., although satisfactory for use with contemporary automated sample liquid analysis systems, does not include provision for sample liquid overflow; and this renders the precise filling as required of this prior art microsample cup to a predetermined maximum level somewhat tedious, and especially in view of the very small sample liquid quantities in question. In addition, this prior art microsample cup, when properly filled as required to the predetermined maximum level, is somewhat prone to sample liquid evaporation attendant the not insubstanstantial residence time of the filled microsample cup on the automated sample liquid analysis system because this microsample cup contains and presents the sample liquid in such manner that the sample liquid surface is substantially fully exposed to the ambient air; and it will be clear to those skilled in this art that the significance of the problem of sample liquid evaporation is, of course, greatly magnified when dealing with very small available sample liquid quantities. Too, this substantial exposure of the sample liquid surface, and the attendant increase in the probability of accidental contact by the fingers of the operating personnel therewith, of late increasingly leads to significant personnel problems in those instances wherein the sample liquid in question is, for example, a blood sample which might be a carrier of an infectious disease.

Further, the filling of this prior art microsample cup above the predetermined maximum sample liquid level, as can readily occur in the absence of very careful attention to cup filling on the part of the operating personnel—who are required to precisely fill a large plurality of the microsample cups in sequence for a single "run" of the automated sample liquid analysis system—functions to increase the residence time of the very precisely fixed-travel sample liquid aspiration probe in the sample liquid; and this can significantly degrade sample liquid aspiration accuracy, and accordingly the overall accuracy of the sample liquid analysis results, of contemporary highly sophisticated and precisely operable automated sample liquid analysis systems. Finally, the substantial exposure of the surface of the sample liquid to the ambient air in this prior art microsample cup, coupled with the facts that the same operates to dispose that surface in close proximity to the upper cup edge and lacks any provision for the collection of sample liquid overflow, can be particularly conducive to sample liquid spillage from the cup, and especially in those instances wherein the cup is filled beyond the predetermined maximum sample liquid level.

The 250 microliter microsample cup currently marketed by the Fisher Scientific Company of Pittsburgh, Pa., although also satisfactory for use with contemporary automated sample liquid analysis systems, is very similar in essential structural and functional characteristics to the above-described Technicon prior art microsample cup; and is thus prone to essentially the same operational problems.

The broad concept of provision for sample liquid overflow from a sample liquid container to insure the filling of the sample liquid container to a predetermined maximum level attendant use of the container in an automated sample liquid analysis system is disclosed in U.S. Pat. No. 4,602,995 issued July 29, 1986 to Michael M. Cassaday, et als, for "Liquid Level Adjusting And Filtering Device," assigned to the assignee hereof. In this instance, however, the device is separate and distinct from the sample liquid container, and must be manually inserted therein after the sample liquid has been poured thereinto to perform the sample liquid level adjusting function. This, of course, results in a relatively—at least in the context of this application—complex, two-piece sample liquid container. In addition, this device performs a sample liquid pumping and filtering function attendant the sample liquid level adjustment; and these additional functions coupled with the relatively large size of the device, and of the sample liquid container with which the same is used, would, as a practical matter, clearly rule out any realistic use of this device with sample liquids in the microsample quantity range.

OBJECTS OF THE INVENTION

It is accordingly an object of this invention to provide a new and improved microsample cup.

It is another object of this invention to provide a microsample cup as above which, through the inclusion of sample liquid overflow collection means, is readily and conveniently fillable to a precisely determined maximum level.

It is another object of this invention to provide a microsample cup as above which operates to greatly inhibit evaporation of the sample liquid into the ambient air.

It is another object of this invention to provide a microsample cup as above which operates to greatly inhibit spillage of the sample liquid therefrom.

It is another object of the invention to provide a microsample cup as above which operates to greatly inhibit contact by the fingers of the cup operating personnel with the sample liquid contained therein.

It is another object of this invention to provide a microsample cup as above which is of particularly simple and economical one-piece construction.

It is a further object of this invention to provide a microsample cup as above which is particularly adapted for use in contemporary automated sample liquid analysis systems.

SUMMARY OF THE INVENTION

This invention provides a new and improved microsample cup which is particularly adapted for use in contemporary automated sample liquid analysis systems which operate to automatically sequentially analyze sample liquids ranging in volume from 200 to 500 microliters. The microsample cup comprises a generally cylindrical outer cup body member, and a generally cylindrically cup-shaped inner sample liquid vessel supported therefrom generally concentrically therewithin by an integral, generally ring-shaped support member. Contiguous wall surfaces of the outer body member, inner sample liquid vessel and support member cooperate to form a generally U-shaped sample liquid overflow reservoir which completely surrounds the inner sample liquid vessel; whereby the precise filling of the inner sample liquid vessel to a predetermined maximum level coincident with the maximum sample liquid capacity of the inner sample liquid vessel is greatly facilitated by the fact that any sample liquid in excess of that capacity introduced into the inner sample liquid vessel will simply overflow therefrom into the sample liquid reservoir. The outer body member extends significantly above the upper edge of the inner sample liquid vessel to shield the same from relative movement of the ambient air thereby inhibiting sample liquid evaporation therefrom, and reducing the probability of accidental contact by the fingers of the operator with the sample liquid. This also reduces the probability of sample liquid spillage from the microsample cup. The outer body member also extends significantly below the bottom of the inner sample liquid vessel to, in combination with the above, facilitate manual handling of the microsample cup.

DESCRIPTION OF THE DRAWINGS

The above and other objects and significant advantages of my invention are believed made clear by the following detailed description thereof taken in conjunction with the accompanying drawings wherein.

DETAILED DESCRIPTION OF THE INVENTION

Figure 2:
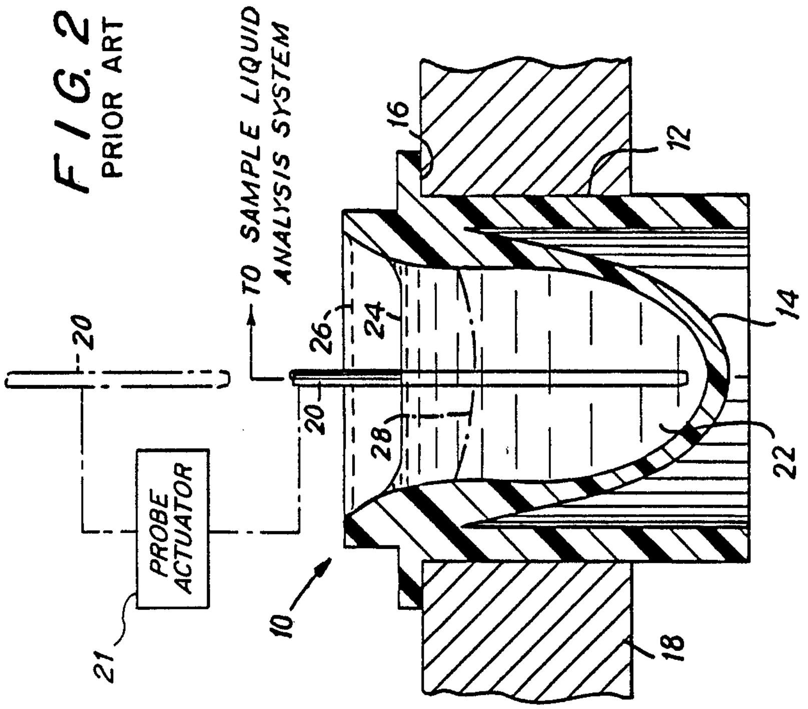
FIG. 2 PRIOR ART
FIG. 2 is a vertical cross-sectional view taken generally along line 2—2 in FIG. 1.
Figure 1:
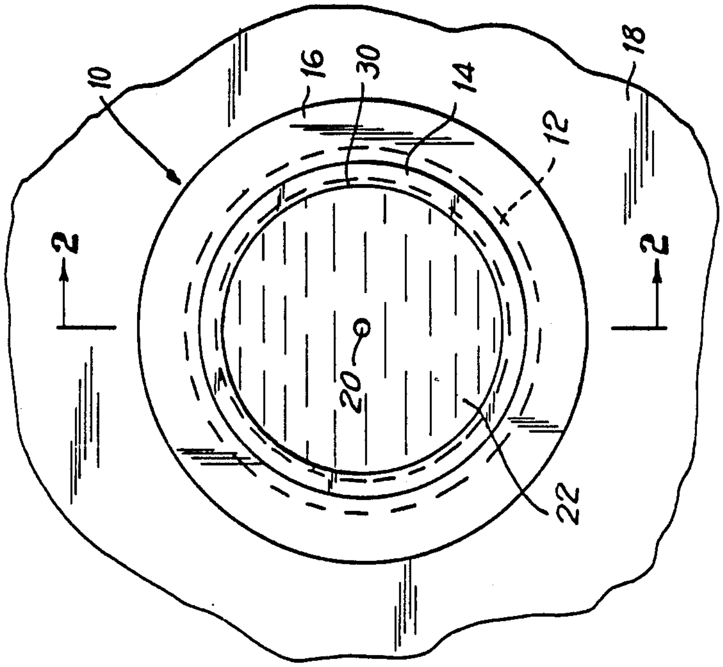
FIG. 1 PRIOR ART
FIG. 1 is a top plan view of a microsample cup representatively configured and operable in accordance with the principles of the prior art.

Referring initially to FIGS. 1 and 2 of the drawings, a microsample cup representatively configured and operable in accordance with the principles of the prior art is indicated generally at 10, and comprises an outer, generally cylindrical cup body member 12, and an inner sample liquid vessel 14 formed integrally therewith and supported therefrom generally concentrically therewithin. A microsample cup mounting ring as indicated at 16 is formed as shown on the outer body member 12 to extend radially outward therefrom for purposes of mounting the cup 10 on a carrier block or like microsample cup supporting and indexing device 18 of an automated sample liquid analysis system. This sample liquid analysis system, which may for example take the form of a highly advanced contemporary version of the sequential multiple sample liquid automated analysis system disclosed in U.S. Pat. No. 3,241,432 issued Mar. 22, 1966 to Leonard T. Skeggs, Ph.D. and assigned to the assignee hereof, includes a very precisely operable sample liquid aspiration probe as indicated at 20; and is operable to present each of a series of the sample liquid-containing microsample cups 10 in turn to the aspiration probe 20 for the sequential aspiration thereby of a plurality of precisely predetermined, like sample liquid quantities therefrom, and supply to the analysis system for precise automated sample liquid quantity analysis with regard to one or more sample liquid constituents.

To this effect, small volumes of the sample liquids in question, for example 200 microliters, must of course first be disposed in the inner sample liquid vessel 14 of each of the microsample cups 10; and, for representative use of the microsample cup 10 attendant automated blood sample analysis, the small available blood sample volumes as dicated by the limited blood sample availability from donors in the nature of premature babies or geriatric patients, are typically procured by capillary stick at the finger or heel of the donor, processed as required by centrifugation of the capillary to separate the blood sample plasma from the blood sample cells, and the thusly separated small blood plasma sample volume then placed via the capillary in the inner sample liquid vessel 14. A sample liquid aspirating probe is indicated at 20 in FIG. 2, and is moveable relative to the microsample cup 10 under the control of a probe actuator as indicated schematically at 21 in FIG. 2. Since the travel of the sample liquid aspirating probe 20 in FIG. 2 between the position thereof as shown by solid lines in FIG. 2 wherein the inlet end of the probe is immersed in the blood sample as there indicated at 22 for aspiration thereof and supply as indicated to the analysis system, and the probe position as shown in dashed lines in FIG. 2 wherein the probe 20 is completely out of the microsample cup 10 and "between" blood sample liquid aspirations, is very precisely fixed and unvariable, and since the acceleration with and velocity at which the aspirating probe 20 can be moved between those positions when the probe is to any extent immersed in the blood sample liquid 22 are very strictly limited by factors having a direct bearing on the requisite very high degree of blood sample aspiration accuracy, it will be clear to those skilled in this art that it is of vital importance to the overall accuracy of the blood sample liquid analysis results that the inner sample liquid vessel 14 of each of the microsample cups be filled as described with blood sample liquid to exactly the same precisely predetermined maximum level as illustrated by the solid line blood sample liquid meniscus 24 in FIG. 2. More specifically, it will be clear that filling of the inner vessel 14 with blood sample liquid above that cerefully predetermined maximum level as indicated by the dashed line blood sample liquid meniscus 26 in FIG. 2 will increase the residence time of the aspirating probe 20 in the same to extend into those time periods when the probe is being accelerated and/or moved in the interests of high speed overall analysis system operation at rates and/or velocities which exceed those permitted by the dynamics of the probe-blood sample liquid interaction; while filling of the innner sample vessel 14 with the blood sample liquid 22 below that level as illustrated by the phantom line meniscus 28 in FIG. 2 can ultimately result upon repeated blood sample liquid quantity aspiration as is common by the aspiration probe 20 from the same microsample cup 10 in less than the required blood sample liquid volume remaining in the inner sample vessel 14 for subsequent aspiration and analysis as required. Thus, and although visible indicia in the nature of a guide line or the like as indicated at 30 in FIG. 1, and not visible in FIG. 2, may be formed in the body of the inner sample liquid vessel 14 to assist the operator in filling the vessel to exactly the same maximum predetermined level in each instance, it will be readily understood by those skilled in this art that the very samll sample liquid volumes, and commensurately small dimensions of the inner sample liquid vessel 14 make this a somewhat difficult and tedious task, and especially in those representative instances as discussed hereinabove wherein a large plurality of the microsample cups 10 must be precisely filled as described in relatively rapid succession in preparation for a typical "run" of an automated blood sample liquid analysis system. This is to say that errors can and do occur, and that the overall accuracy of the blood sample liquid analysis results can and does suffer as a result.

In addition to the above, it will be clear that since the surface of the blood sample liquid 22 in the inner sample liquid vessel 14 is, in any event, substantially exposed to the ambient air, evaporation of the sample liquid is promoted; and this can, of course, be of significant consequence in view of the very small sample liquid volumes here involved. Too, and although a microsample cup cover, not shown, can be provided to cover a plurality of the microsample cups 10 and inhibit evaporation therefrom, it will be clear that the disposition of the surface of the blood sample liquid 22 as shown very close to the upper edge of the inner sample liquid vessel 14, and especially in those instances wherein the same is filled as indicated by the meniscus 26 above the maximum predetermined level, promotes smearing or the like of the blood sample liquid 22 on the underside of that evaporation cover with resultant increase in the probability of contact by the fingers of the operator with the blood sample liquids upon removal of the evaporation cover from the microsample cups 10; and this increased probability of contact with the blood sample liquids can lead to significant operator personnel problems, particularly in those instances wherein the blood sample liquids in question might be carriers of an infectious disease. Also, it will be clear that the disposition of the blood sample liquid surface very close to the upper edge of the inner sample liquid vessel 14, and thus to the upper edge of the microsample cup 10 as a whole, will, in any event, promote spillage of the blood sample liquid therefrom; and again especially in those instances wherein the prior art microsample cup 10 is filled above the maximum predetermined level.

Figure 4:
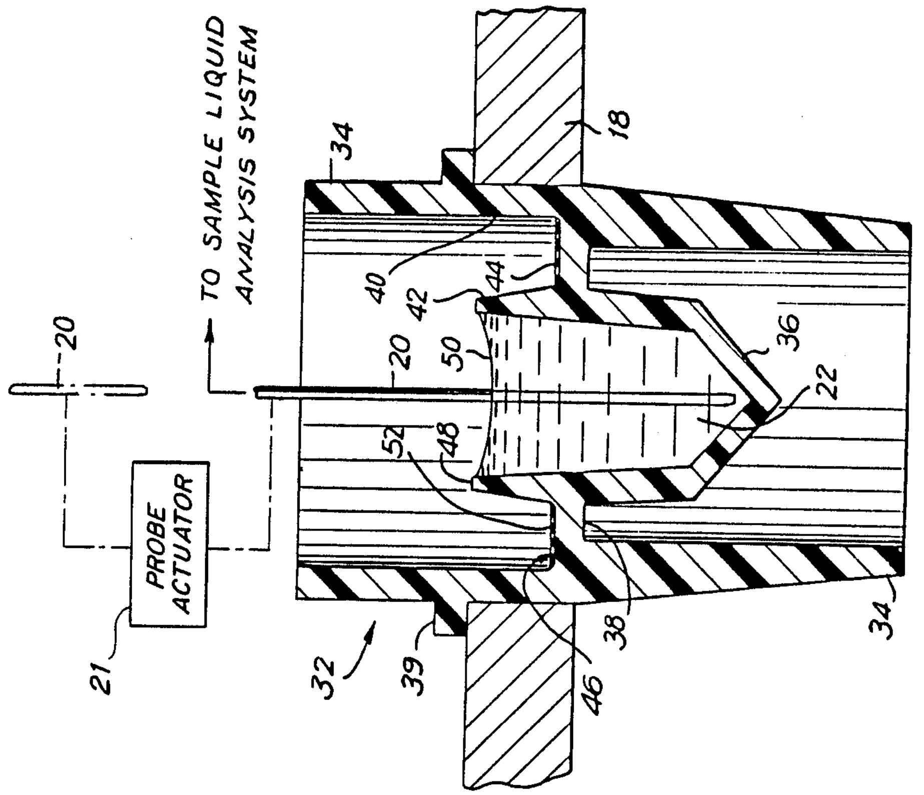
FIG. 4 is a vertical cross-sectional view taken generally along line 4—4 in FIG. 3.
Figure 3:
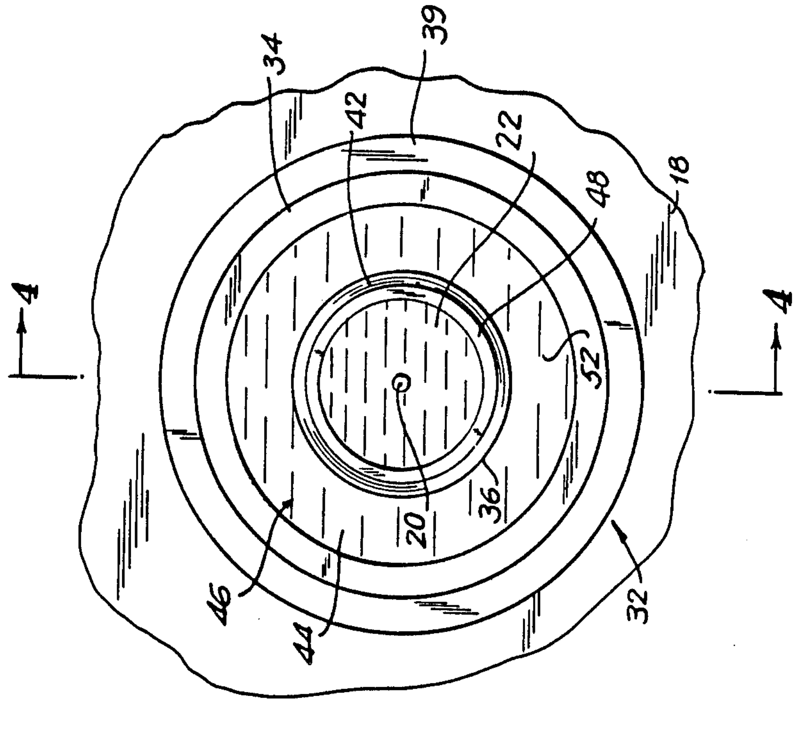
FIG. 3 is a top plan view of a new and improved microsample cup representatively configured and operable in accordance with the teachings of my invention.

Referring now to FIGS. 3 and 4, a new and improved microsample cup representatively configured and operable in accordance with the teachings of my invention is indicated generally at 32; and comprises a generally cylindrical outer cup body member 34, and a generally cylindrically cup-shaped inner sample liquid vessel 36 supported therefrom generally concentrically therewithin by an integral, generally ring-shaped support member 38. FIG. 4 makes clear that the outer body member 34 extends significantly above and below the inner sample liquid vessel 36. A microsample cup mounting ring 39 extends radially outward of the outer body member 34 for mounting of the cup 32 on a carrier block 18 of automated sample liquid analysis apparatus.

FIGS. 3 and 4 make clear that the inner wall surface 40 of the outer cup body member 34 and the outer wall surface 42 of the inner sample liquid vessel 36 cooperate as shown with the upper wall surface 44 of the integral support member 38 to form a generally U-shaped sample liquid overflow reservoir as indicated at 46 which completely surrounds the upper edge 48 of the inner sample liquid vessel 36. As a result, it will be immediately clear to those skilled in this art that filling by the operator of inner sample liquid vessel 36 with the blood sample liquid 22 to its carefully predetermined maximum level—which will coincide with the filling of the vessel to its full capacity as illustrated by the blood sample liquid meniscus 50 in FIG. 4—is greatly facilitated because any blood sample liquid in excess of that capacity, within reasonable limits of course, will simply overflow the inner sample liquid vessel 36 for flow into and containment in the sample liquid overflow reservoir 46. A representative quantity of blood sample liquid overflow is illustrated at 52 in sample liquid overflow reservoir 46 in FIG. 4. As a result, and although great care and full attention to cup filling detail are still required on the part of the operator for filling to precisely the maximum predetermined level in each instance as described hereinabove by capillary or like device of a large plurality of the microsample cups 32 of my invention in preparation for an automated blood sample liquid analysis system "run," it will be clear that the chances for error attendant the same are advantageously greatly reduced by the teachings of my invention in that the operator can be instructed to fill each of the microsample cups 32 until just the very slightest and thus analytically inconsequential, although nonetheless readily visibly discernible, quantity of the blood sample liquid appears in the sample liquid overflow reservoir 46, thus insuring in each instance that the inner sample liquid vessel 36 of the microsample cup 32 in question has been filled by the blood sample liquid 22 to precisely its predetermined maximum level. Thus, the blood sample liquid aspirating probe as again indicated at 20 in FIG. 4 will have exactly the same maximum residence time in the blood sample liquid quantities 22 in each of the plurality of the microsample cups 32 under discussion; whereby consistent operation of the aspirating probe 20, under the control of a probe actuator as again indicated schematically at 21 in FIG. 4, at maximum accelerations and velocities for the probe operating time periods outside of that maximum blood sample liquid residence time of the probe, and commensurate in each instance with high speed operation and sample analysis rate of the analysis system, can be accomplished for all of the microsample cups 32 attendant a blood sample liquid analysis "run" of the sample liquid analysis system, all without realistic possibility of sacrifice in the requisite very high degree of blood sample liquid aspiration accuracy.

Regarding blood sample liquid evaporation, it will be clear that the generally straight and vertically oriented inner wall surface 40 of the outer cup body member 34 which completely surrounds the upper edge 48 of the inner sample liquid vessel 36, and the significant vertical extent of that wall surface 40 above the upper vessel edge 48, both as clearly illustrated by FIGS. 3 and 4, advantageously operate to substantially shield the surface of the blood sample liquid 22 at the upper edge of the inner sample liquid vessel 36 from the natural and microsample cup indexing-induced relative movement of the ambient air, whereby blood sample liquid evaporation from the inner sample liquid vessel 36 is greatly inhibited; it being noted that once saturation by blood sample liquid molecules of the relatively stagnant ambient air in the shielded cup space 54 above the inner sample liquid vessel 36 occurs, very little if any further evaporation of the blood sample liquid 22 from the vessel 36 will take place.

An additionally significant advantage of the microsample cup 32 of my invention resides in the fact that the substantial extent of the inner wall surface 40 of the outer cup body member 34 above the surface of the blood sample liquid 22 in the inner sample vessel 36 operates to very greatly reduce the probability of direct contact by the fingers of the operator with the blood sample liquid in the inner vessel; and operates to very greatly reduce the probability of smearing of the blood sample liquid from the microsample cup on an evaporation cover or the like as may be used to cover a plurality of the same, thus reducing to a like degree the probability of subsequent contact by the fingers of the operator with the blood sample liquid from that source. Also, the probability of blood sample liquid spillage from the microsample cup 32 as a whole is, within reasonable limits, virtually eliminated by the substantial extent of the outer cup body member inner wall surface 40 above the upper support member wall surface 44 which forms the bottom of the sample liqiud overflow reservoir 46; and this, of course, further promotes compliance with essential standards of clinical cleanliness as are required attendant blood sample liquid handling and automated analysis. As a result of all of these factors, the probability of personnel problems arising from accidental contact by the operator(s) with the blood sample liquids in question is, again within reasonable limits, advantageously reduced to an absoulte minimum by the teachings of my invention.

A representative sample liquid aspirating probe with which the new and improved microsample cup 32 of my invention is particularly adapted for use attendant automated blood sample liquid analysis is that disclosed in U.S. Pat. No. 4,121,466 issued Oct. 24, 1978 to Allen Reichler and Herman G. Diebler, and assigned to the assignee hereof.

Although the essential dimensions of the new and improved microsample cup 32 of my invention may, of course, vary in accordance with the requirements of the application to which the same is to be put, the extent of the inner wall surface 40 of the outer body member 34 above the upper edge 48 of the inner sample liquid vessel 36 is preferably made at least equal to the inner diameter of that sample liquid vessel; and it will be clear that the vertical extension as shown and described of the outer body member 34 to not insubstantial extents both above the upper edge and below the lower edge of the inner sample liquid vessel 36 adds significantly to the overall vertical dimension of the microsample cup 32, and thus contributes materially to increased ease of manual cup handling by the operator(s).

Representative dimensions for the new and improved microsample cup 32 of my invention are: an overall height of the outer body member 34 of approximately 25 millimeters; an internal diameter at the upper edge of the outer body member 34 of approximately 10 millimeters; an overall depth of the inner sample liquid vessel 36 of approximately 10 millimeters; an internal diameter at the upper edge 48 of the inner sample liquid vessel 36 of approximately 6 millimeters; a distance between the upper edge 48 of the inner sample liquid vessel 36 and the upper edge of the outer body member 34 of approximately 8 millimeters; and a distance between the bottom of the inner sample liquid vessel 36 and the lower edge of the outer body member 34 of approximately 7 millimeters.

A representative capacity for the inner sample liquid vessel 36 is 250 microliters of sample liquid.

Fabrication of the new and improved microsample cup 32 of my invention is readily and economically accomplished by high speed injection molding of an appropriately chemically inert plastic material, for example polyethylene, thus rendering the microsample cup economically disposable after but a single usage.

Although disclosed hereinabove by way of representative example in the context of use for automated blood sample liquid analysis, it will be clear to those skilled in this art that the new and improved microsample cup 32 of my invention is by no means limited thereto, but rather, can be used with equally advantageous effect with other and different biological sample liquids, for example urine samples, or with a wide variety of other and different non-biological sample liquids.

Various changes may, of course, be made in the teachings of my invention as disclosed herein without departing from the spirit and scope of that invention as defined by the appended claims.

What is claimed is:

1. A microsample cup for the containment of sample liquids comprising, an outer body member, an inner sample liquid vessel disposed within said outer body member and spaced therefrom for the containment of a sample liquid within said sample liquid vessel, and a support member integral with said outer body member and said inner sample liquid vessel and operable to support said inner sample liquid vessel from said outer body member, said outer body member, inner sample liquid vessel, and said support member being positioned and arranged respectively to each other so as to form a sample liquid overflow reservoir between said outer body member and said inner sample liquid vessel which surrounds said inner sample liquid vessel whereby, the precise filling of said inner sample liquid vessel to a maximum predetermined sample liquid level coincident with the maximum sample liquid capacity of said inner sample liquid vessel is facilitated by the overflow of sample liquid introduced into said inner sample liquid vessel in excess of that maximum capacity into said sample liquid overflow reservoir from said inner sample liquid vessel, said inner sample liquid vessel having a sample liquid capacity in the range of from 200 to 500 microliters.

2. A microsample cup for the containment of sample liquids comprising, an outer body member, an inner sample liquid vessel disposed within said outer body member and spaced therefrom for the containment of a sample liquid within said sample liquid vessel, and a support member operatively connecting said outer body member and said inner sample liquid vessel and operable to support said inner sample liquid vessel from said outer body member, said outer body member, inner sample liquid vessel, and said support member being positioned and arranged respectively to each other so as to form a sample liquid overflow reservoir between said outer body member and said inner sample liquid vessel which surrounds said inner sample liquid vessel whereby, the precise filling of said inner sample liquid vessel to a maximum predetermined sample liquid level coincident with the maximum sample liquid capacity of said inner sample liquid vessel is facilitated by the overflow of sample liquid introduced into said inner sample liquid vessel in excess of that maximum capacity into said sample liquid reservoir from said inner sample liquid vessel, said inner sample liquid vessel having a sample liquid capacity in the range of from 200 to 500 microliters.

3. A sample cup for the containment of sample liquids comprising, a generally cylindrical outer body member, a generally cup-shaped inner sample liquid vessel disposed generally concentrically within said outer body member for the containment of sample liquids within said sample liquid vessel, said sample liquid vessel being impermeable by sample liquids, a generally ring-shaped support member integral with and operatively connecting said inner sample liquid vessel and said outer body member and operable to support said inner sample vessel from said outer body member, said outer body member, inner sample liquid vessel and said support member being positioned and arranged respectively to each other so as to form a sample liquid overflow reservoir between said outer body member and said inner sample liquid vessel which surrounds said inner sample liquid vessel whereby, the precise filling of said inner sample liquid vessel to a maximum predetermined sample liquid level coincident with the maximum sample liquid capacity of said inner sample liquid vessel is facilitated by the overflow of sample liquid introduced into said inner sample liquid vessel in excess of that maximum capacity into said sample liquid overflow reservoir from said inner sample liquid vessel.

4. A sample liquid cup as in claim 3 wherein, said outer body member extends above said inner sample liquid vessel to an extent at least equal to the inner diameter of said sample liquid vessel whereby, evaporation of a sample liquid from said inner sample liquid vessel is inhibited.

5. A sample cup for the containment of sample liquids comprising, an outer body member, an inner sample liquid vessel disposed within said outer body member and spaced therefrom for the containment of a sample liquid within said sample liquid vessel, and a support member integral with said outer body member and said inner sample liquid vessel and operable to support said inner sample liquid vessel from said outer body member, said outer body member, inner sample liquid vessel, and said support member being positioned and arranged respectively to each other so as to form a sample liquid overflow reservoir between said outer body member and said inner sample liquid vessel which surrounds said inner sample liquid vessel, and said outer body member extending significantly above said inner sample liquid vessel whereby, the precise filling of said inner sample liquid vessel to a maximum predetermined sample liquid level coincident with the maximum sample liquid capacity of said inner sample liquid vessel is facilitated by the overflow of sample liquid introduced into said inner sample liquid vessel in excess of that maximum capacity into said sample liquid overflow reservoir from said inner sample liquid vessel, and evaporation of said sample liquid from said inner sample liquid vessel is inhibited.

6. A sample liquid cup as in claim 5 wherein, said outer body member also extends significantly below said inner sample liquid vessel whereby, manual handling of said sample liquid cup is facilitated.

7. A sample cup for the containment of sample liquids comprising, an outer body member, an inner sample liquid vessel disposed within said outer body member and spaced therefrom for the containment of a sample liquid within said sample liquid vessel, and a support member integral with said outer body member and said inner sample liquid vessel and operable to support said inner sample liquid vessel from said outer body member, said outer body member, inner sample liquid vessel, and said support member being positioned and arranged respectively to each other so as to form a sample liquid overflow reservoir between said outer body member and said inner sample liquid vessel which surrounds said inner sample liquid vessel, said sample liquid reservoir being defined by contiguous wall surfaces of said outer body member, said inner sample liquid vessel, and said support member, respectively, whereby, the precise filling of said inner sample liquid vessel to a maximum predetermined sample liquid level coincident with the maximum sample liquid capacity of said inner sample liquid vessel is facilitated by the overflow of sample liquid introduced into said inner sample liquid vessel in excess of that maximum capacity into said sample liquid overflow reservoir from said inner sample liquid vessel.

8. A sample cup for the containment of sample liquids comprising, a generally cylindrical outer body member, a generally cup-shaped inner sample liquid vessel disposed generally concentrically within said outer body member for the containment of sample liquids within said sample liquid vessel, said sample liquid vessel being impermeable by sample liquids, a generally ring-shaped support member operatively connecting said inner sample liquid vessel and said outer body member and operable to support said inner sample liquid vessel from said outer body member, said outer body member, inner sample liquid vessel and said support member being positioned and arranged respectively to each other so as to form a sample liquid reservoir between said outer body member and said inner sample liquid vessel which surrounds said inner sample liquid vessel, a sample liquid aspirating probe operatively associated with said inner sample liquid vessel, and sample liquid probe actuator means operatively associated with said sample liquid aspirating probe and operable to move said probe relative to said inner sample liquid vessel from a first probe position wherein said sample liquid probe is immersed in a sample liquid in said inner sample liquid vessel to aspirate sample liquid therefrom, to a second probe position wherein said probe is not so immersed.

* * * * *